3,283,025
HYDROCARBON PURIFICATION
Robert E. Lenz and George D. Oliver, Texas City, Tex., assignors to Monsanto Company, St. Louis, Mo., a corporation of Delaware
Filed Dec. 31, 1963, Ser. No. 334,751
10 Claims. (Cl. 260—677)

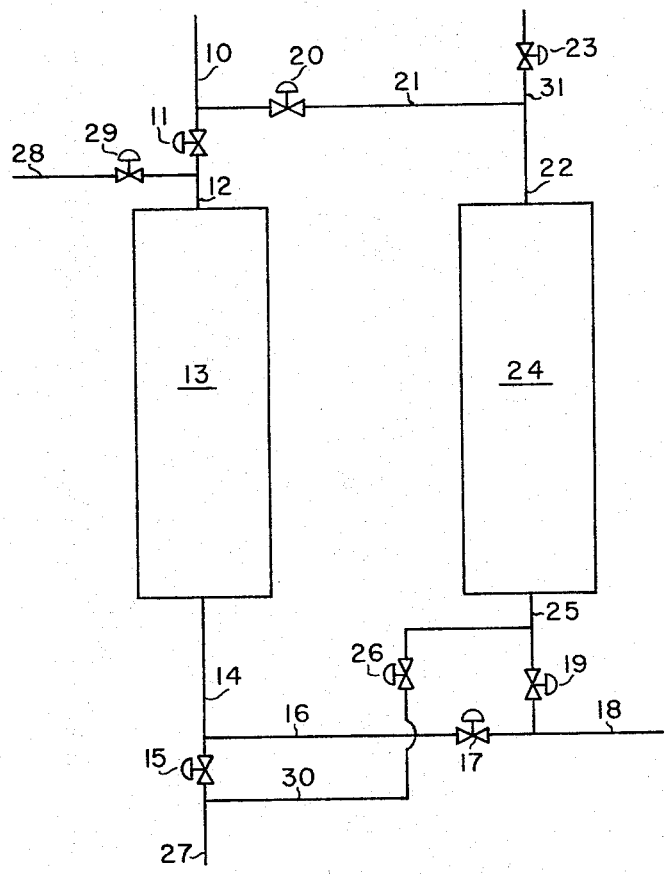

The present invention relates to the purification of hydrocarbons. More particularly, the present invention relates to the removal of nitrogen-containing organic impurities from hydrocarbons. Specifically, the present invention relates to the purification of hydrocarbons containing as impurities small amounts of nitrogen-containing organic compounds.

In many situations, hydrocarbon product streams containing hydrocarbons of varying degrees of unsaturation are produced. When hydrocarbon fractions and petroleum feeds are subjected to cracking or dehydrogenation, as well as certain other hydrocarbon conversion processes, the resulting products often include saturated paraffinic and/or naphthenic hydrocarbons, mono-olefinic hydrocarbons and/or polyolefinic hydrocarbons and/or acetylenic hydrocarbons and often aromatic hydrocarbons. In order to obtain maximum utilization from these products, it generally is necessary to separate these product mixtures according to molecular weight and hydrocarbon classes, e.g., saturated, mono- and di-unsaturated, etc. Distillation will usually suffice for separation according to molecular weight as represented by carbon number, but is usually ineffective for making efficient separation by hydrocarbon class. Among the more useful methods of making this latter separation is liquid-liquid or vapor-liquid solvent extraction. A particularly useful group of selective solvents for this separation are the nitrogen-containing organic solvents such as furfural, the N,N-dialkylarylamides, furfuraldehyde, and the like. While these extraction techniques substantially separate the hydrocarbons according to hydrocarbon class, by selectively absorbing the more unsaturated, the unabsorbed hydrocarbons are often contaminated with small amounts of these nitrogen-containing organic solvents. For many possible utilities, the presence of these small amounts of nitrogen-containing organic solvents is highly detrimental. Thus, it becomes necessary to have a simple and economically acceptable method for removing these small amounts of nitrogen-containing organic solvents from the hydrocarbons if maximum utilization of these hydrocarbons is to be obtained.

It is an object of the present invention to provide a new and novel method for the purification of hydrocarbons. Another object of the present invention is to provide a method whereby hydrocarbons containing as impurities small amounts of nitrogen-containing organic compounds may be substantially separated from said impurities. It is another object of the present invention to provide a method for the removal of impurities comprising small amounts of nitrogen-containing organic selective solvents from hydrocarbons which have been contaminated with said impurities through the use of said nitrogen-containing organic selective solvents to selectively remove other impurities from said hydrocarbons. Additional objects will become apparent from the following description of the invention herein disclosed.

The present invention, which fulfills these and other objects, comprises contacting hydrocarbons contaminated with small amounts of nitrogen-containing organic compounds with silica gel thereby causing said nitrogen-containing organic compounds to be adsorbed on said silica gel. After the silica gel becomes loaded with adsorbed material to an extent such as to render its further use uneconomical, the loaded silica gel is regenerated by flowing an inert gas through the silica gel bed countercurrent to the direction in which the contaminated hydrocarbons were passed into contact with the silica gel while maintaining the regeneration zone at a temperature of 220 to 275° C. By the use of the present invention, the amount of nitrogen-containing contaminant in the hydrocarbons may be reduced to less than 1 p.p.m.

To further describe the present invention, reference is made to the accompanying drawing which is a schematic drawing of the purification system of the present invention in one of its embodiments. Referring to the drawing a hydrocarbon stream containing nitrogen-containing organic compounds as impurities is passed by means of line 10 through valve 11 and line 12 into adsorption bed 13 which is packed with silica gel. During the introduction of the impure hydrocarbons into adsorption bed 13, valves 29 and 20 are closed to prevent flow through lines 28 and 21. The purified hydrocarbons pass from adsorption bed 13 by means of lines 14 and 16 through valve 17 and line 18 to storage or other subsequent utility. Valve 15 remains closed during the exit of hydrocarbons from adsorption bed 13.

Once adsorption of silica gel bed 13 is complete, valves 11 and 17 are closed, and valve 20 opened. Thereby, the contaminated hydrocarbon stream is diverted through valve 20 into lines 21 and 22 into a second silica gel bed 24. During the introduction of hydrocarbon into silica gel bed 24, valve 23 is maintained in a closed position. From silica gel bed 24 the purified hydrocarbons pass by line 25 through valve 19 into line 18 to storage or subsequent utility. In leaving silica gel bed 24, the purified hydrocarbons are prevented from entering line 30 by valve 26 which is closed.

During the period of time hydrocarbons are being introduced into silica gel bed 24, an inert gas is passed by means of line 27 through valve 15 and by line 14 into silica gel bed 13. This inert gas has been preheated to a temperature of approximately 220 to 275° C. The inert gas passing through silica gel bed 13 regenerates the bed by purging adsorbed nitrogen-containing compounds from the silica gel and carries those compounds by means of line 13 into line 28 and through valve 29 to their future disposition. During the introduction of the inert gas into silica gel bed 13, valve 26, located on line 30, as well as valve 17 and valve 11 are maintained in a closed position.

After silica gel bed 13 is regenerated and bed 24 is completely loaded with adsorbed materials, valves 20, 19, 15 and 29 are closed and valves 11, 17, 26 and 23 are opened so that impure hydrocarbons may once more be introduced into silica gel bed 13 and adsorption bed 24 regenerated. The flow of inert gas being introduced by line 27 is thereby diverted into line 30 and through open valve 26 into line 25 and into silica gel bed 24. The inert regeneration gas containing desorbed nitrogen-containing compounds then passes from silica gel bed 24 by line 22 and 31 through valve 23 to future disposition.

Those skilled in the art will readily recognize the possibility of any number of modifications of the present invention. Of course, a single silica gel bed may be used with alternate adsorption and desorption periods. Also, three or more silica gel beds in parallel may be used with each for various stages of the adsorption-desorption cycle. So long as the modifications require the passing of the contaminated hydrocarbon into contact with silica gel with the silica gel thereafter being desorbed by countercurrent treatment with an inert gas and the temperature of the silica gel being 220 to 275° C., such modifications are within the spirit and scope of the present invention.

In order to further describe and to illustrate the present invention, the following examples are presented. These examples are merely exemplary and are not to be construed as limiting the present invention.

*Example I*

Approximately 400 grams of grade 03 on 8 mesh silica gel manufactured by Davidson Chemical Co. was placed in an adsorption chamber 1 inch in diameter and 3 feet long. Ethylene containing 200 p.p.m. of dimethylformamide was passed through the silica gel bed at 80 cubic feet per hour. The pressure in the adsorption zone was approximately 360 p.s.i.g and the temperature was within the range of from 22 to 25° C. The effluent ethylene was continuously monitored for DMF in the effluent. The ethylene contained less than 1 p.p.m. of DMF until 169 hours had elapsed after which time the DMF concentration in the effluent was found to be 1 to 1.5 p.p.m. Introduction of ethylene was then stopped. The silica gel was found to have adsorbed 25.7 weight percent of DMF.

*Example II*

Example I was substantially repeated with the exception that the amount of silica gel was approximately 200 grams and the length of the adsorption bed was 1½ feet. Also, the flow velocity was increased to 160 cubic feet per hour for this run. The ethylene effluent contained less than 1 p.p.m. of DMF for 30 hours after which time the concentration of DMF increased to 1 to 1.5 p.p.m. Introduction of ethylene was stopped at this point. The silica gel was found to have adsorbed 17.3 weight percent of DMF. Regeneration of the silica gel was carried out by maintaining a temperature of approximately 250° C. for 29½ hours while nitrogen was passed over the gel at a flow velocity of 10 cubic feet per hour in a direction opposite to that in which the ethylene was passed during the adsorption cycle. Regeneration was stopped when the level of DMF in the nitrogen effluent contained less than 1 p.p.m. Ethylene containing 200 p.p.m. of DMF again passed through the silica gel bed as described above. Again, the ethylene was passed through the bed for 30 hours before the DMF concentration reached the 1 p.p.m. concentration again. At this point the ethylene flow was stopped. The silica gel was found to have adsorbed 16.9 weight percent of DMF. From this example, it is apparent that good adsorption results are obtained with little or no loss in efficiency as a result of regeneration in acordance with the present invention.

*Example III*

To demonstrate the affect of regeneration temperatures on regeneration efficiency, three separate regenerations were carried out using nitrogen as a regeneration gas with each regeneration being carried out at different temperatures. The silica gel bed was adsorbed to capacity prior to each regeneration with adsorbed DMF. Pressures in the regeneration zone were substantially the same. Flow velocities of the nitrogen were 10, 10 and 40 cubic feet per hour respectively for the three regenerations. The following table summarizes the amount of gas used, time and the amount DMF in the effluent at end of that time at the various temperatures.

| Temp., ° C. | Cu. Ft. $N_2$ Used | Time, Hrs. | Amt. DMF in effluent after time, p.p.m. |
|---|---|---|---|
| 275 | 320 | 36 | <1 |
| 250 | 350 | 29½ | <1 |
| 175 | 846 | [1] 33 | 146 |

[1] Stopped at 33 hours because obvious that time would be far too long to be practical. This example clearly indicates that at lower temperatures, the time necessary for regeneration, if possible at all, is far too long for practical use and that the amount of gas necessary for regeneraton at the lower temperature is highly excessive.

The silica gel used as an adsorbent for the nitrogen containing compound impurities in accordance with the present invention is one having a 3 to 200 mesh particle size. Preferably, however, a 3 to 20 mesh particle size silica gel is used in the present invention. Silica gel has been found to have an unusually high adsorption capacity for the nitrogen-containing compounds adsorbed in accordance with the present invention as illustrated by the foregoing examples. Silica gel is a granular amorphous form of silica generally prepared from sodium silicate and sulfuric acid. It has an almost infinite number of entry pores and interconnecting capillaries, however, these are and is nondeliquescent.

Hydrocarbon streams which may be purified according to the practice of the present invention include saturated hydrocarbons such as paraffins or naphthenes and/or monoolefinic hydrocarbons and/or polyolefinic hydrocarbons and/or acetylenic hydrocarbons as well as aromatic hydrocarbons. Since in ordinary usage, virtually any of these hydrocarbons may be separated from their less saturated counterparts of similar molecular weight by nitrogen-containing organic solvents such as furfural, the N,N-dialkylarylamides, i.e., dimethylformamide, dimethyl acetamide, diethylformamide, dimethylpropionamide, and the like, then the present invention may be utilized in the purification of any of these hydrocarbons or mixtures thereof. Generally, it may be stated that any of the nitrogen-containing selective solvents which find utility in the separation of hydrocarbon classes according to the degree of unsaturation may be adsorbed from hydrocarbon streams into which they have become intermixed. The present invention finds its most practical application when the amount of nitrogen-containing organic solvent in the hydrocarbon stream is no greater than 10,000 p.p.m. Generally, the present invention is used to remove the nitrogen-containing organic solvent present in the hydrocarbon as a result of the relative partial pressures of the hydrocarbon and the solvent under the conditions of the extraction column.

The impure hydrocarbon stream may be contacted with the silica gel either in the liquid or vapor state. Usually, this will be a matter of the individual hydrocarbon stream being purified. If the hydrocarbons are normally gaseous, then usually as a practical matter, a vapor-solid contact is preferred though if desired the normally gaseous hydrocarbons may be liquefied. In some instances when normally gaseous hydrocarbons are solvent extracted in the liquid state under superatmospheric pressures, as a process expedient, the hydrocarbon contact with the silica gel may be a liquid-solid contact with the adsorption zone being maintained under sufficient pressure to maintain the hydrocarbons in a liquid state.

When the impure hydrocarbons are passed through the silica gel in the vapor or liquid state in accordance with the present invention, the flow velocity of the hydrocarbon stream within the adsorption zone generally will not exceed 3.00 parts by weight of impure hydrocarbon per hour per part by weight of silica gel. Preferably, however, the flow rate does not exceed 2.85 parts by weight of impure hydrocarbon per part by weight of silica gel. The lower limit of flow rate is, of course, entirely a matter of practicality.

The temperature at which the impure hydrocarbon feed is passed into contact with the silica gel in accordance with the present invention is usually within the range of 20 to 40° C. However, temperatures as low as −70° C. and as high as 140° C. may find utility in carrying out the present invention. Usually, there will be a continuous increase in the temperature of the adsorption zone during the adsorption period as a result of heat of adsorption. Much of this heat is dissipated by the high concentration of hydrocarbons within the adsorption zone at all times and the temperature generally will not vary beyond the above limits. Should the heat of adsorption be such as to create a problem, it may be controlled by conventional means such as increased flow velocity, dilution of the hydrocarbon stream with nonadsorbable materials, etc.

Pressures within the adsorption zone have been found to have little bearing on the adsorption efficiency of the silica gel. Whether superatmospheric pressures are used depends primarily upon the pressures at which the impure hydrocarbon is processed prior to its entry into the silica gel column and to the future of the hydrocarbon stream. For example, if the impure hydrocarbon stream is one which has been subjected to liquid-liquid extraction in the presence of an N,N-dialkylarylamide solvent such as dimethylformamide at relatively high pressures, it is in many instances desired from an overall process standpoint to maintain the pressure at or near that of the extraction unit in the silica gel adsorption zone. Generally, however, pressures within the adsorption zone range from 0 to 500 p.s.i.g. and higher, with pressures of from 0 to 360 p.s.i.g. preferred. Usually pressures toward the higher ends of the range are used with the lighter hydrocarbons with pressures decreasing as the molecular weight of the hydrocarbons in the feed increases.

Quite unexpectedly, it has been found that the silica gel will adsorb as high as 25 percent of its own weight of the nitrogen-containing organic impurities before there is any increase in the concentration of the impurity in the effluent from the adsorption zone. For example, it was found that an ethylene stream containing 200 p.p.m. of DMF was passed over a silica gel to a load of 25.7 percent by weight before the DMF in the ethylene effluent increased to 1 p.p.m. Usually, the amount of nitrogen-containing organic impurity adsorbed by the silica gel prior to breakthrough of significant amounts of impurity in the effluent is realted to the flow velocity within the adsorption zone. As flow velocity increases, adsorption capacity before breakthrough decreases. Therefore, in the practical application of the present invention a practical working balance between economics and efficiency as represented by flow rates and loading capacity must be attained. Usually, this balance is tailored to the particular situation but generally the adjustment of flow rates to attain adsorption capacities of 12 to 25 percent by weight are most useful with adsorption capacities of 12 to 17 percent by weight preferred. The flow velocities hereinbefore defined, generally, will provide these loading capacities prior to breakthrough of significant amounts of contaminant into the hydrocarbon effluent.

Once the breakthrough of nitrogen-containing organic impurity into the hydrocarbon effluent becomes sufficiently great as to exceed the permissible concentration in the hydrocarbon, regeneration of the silica gel becomes necessary. To regenerate the silica gel, it is first necessary to stop the introduction of the impure hydrocarbon into contact with the silica gel. The regeneration procedure comprises passing an inert over the silica gel at a silica gel temperature of 220 to 275° C. Regeneration temperatures of 240 to 260° C. are preferred, however, for optimum results. Care should be exercised in maintaining the regeneration temperature below the 275° C. upper limit since above this temperature there is a likelihood of damage to the silica gel with a resultant significant reduction in adsorption efficiency. At temperatures below 220° C. regeneration becomes impractical since desorption becomes negligible from a practical standpoint.

Usually, the inert regeneration gas is passed over the silica gel at a flow velocity of 50 to 10,000 gaseous volumes per hour per volume of silica gel. Preferably, however, flow velocities of 500 to 5000 gaseous volumes of regeneration gas per hour per volume of silica gel are used.

The direction in which the inert regeneration gas is passed over the silica gel is somewhat critical to the present invention. Though the silica gel may be regenerated by passing the inert gas over the silica gel in the same direction which the impure hydrocarbon flowed during the adsorption period, there is a significant reduction in the adsorption efficiency. In the preferred practice of the present invention, the inert regeneration gas is passed over the silica gel in a direction opposite to that in which the impure hydrocarbon flowed prior to regeneration. To illustrate the importance of this factor, two comparable regeneration, adsorption cycles were made. Adsorption in each was substantially similar in each case. The feed in each case was the same propylene feed containing DMF as the impurity. After adsorption was completed to substantially the same extent in each case, a waste gas stream comprising primarily methane was passed through the bed at a temperature of approximately 232° C. and a flow velocity of about 2.0 ft./sec. The only difference in the two cases was that in the first case the gas was passed in the same direction the hydrocarbon had flowed during the adsorption cycle immediately prior to regeneration while in the second case the gas was passed through the bed in the opposite direction. After regeneration was complete to the same degree in each case, regeneration was stopped and a new adsorption cycle started with the same propylene feed as used initially. Flow rates and temperatures were again substantially comparable in the two adsorptions. The initial propylene effluent in the first case was found to contain as high as 6 p.p.m. DMF while that in the second case was found to contain a maximum of 0.3 p.p.m. DMF. Further, it was found that the ultimate adsorption capacity of the first bed was significantly less than that of the second bed.

The inert regeneration gas may be any of the normally gaseous gases which are nonreactive to the adsorbed nitrogen-containing organic impurities and to the silica gel and should not be a material which is adsorbed and held by the silica gel. In addition vaporized normally liquid compounds such as the lower molecular weight normally liquid saturated hydrocarbons may be used. Such inert gases as nitrogen, hydrogen, $CO_2$, argon, helium and the like may be used as regeneration gases. Further, such gaseous hydrocarbons as methane, ethane, propane, butanes and normally-liquid hydrocarbons as pentane and hexane find utility as regeneration gases in the practice of the present invention. Also, such waste or low value gas streams as flue gas streams may in many instances serve as regeneration gases.

Simplified, the apparatus of the present invention need be no more than a single adsorption vessel containing silica gel and inlet and outlet lines and suitable arrangement of valves for separating the adsorption and the regeneration cycles. However, two or more silica gel beds may be used with varying sequences of adsorption and regeneration such that at all times adsorption in at least one vessel is taking place such that at the end of the adsorption cycle in one bed another bed is regenerated and ready for adsorption. Further, it is within the scope of the present invention that a fluidized bed of silica gel either as a contained bed or as a circulating bed, be used. Many other modifications will be readily apparent to those skilled in the art and so long as they are but modes of carrying out the process of the present invention as defined above are within the spirit and scope of the present invention.

What is claimed is:

1. A process for the purification of an impure normally gaseous hydrocarbon fraction selected from the group consisting of monoolefinic hydrocarbons, polyolefinic hydrocarbons and acetylenic hydrocarbons having as impurities small amounts of nitrogen-containing organic compounds which comprises passing said impure hydrocarbon fraction through an adsorption zone comprising silica gel, the temperature of said adsorption zone being approximately −70 to 140° C. selectively absorbing said nitrogen-containing organic impurities on said silica gel, continuing said adsorbing until said silica gel has adsorbed its maximum capacity of said impurities, stopping the passage of said impure hydrocarbon fraction through said adsorption zone, subsequently regenerating said silica gel by passing an inert gas through said adsorption zone maintained at a temperature of 220 to 275° C. until the silica gel is regenerated, and thereafter again passing an impure hydrocarbon fraction through said silica gel.

2. The process of claim 1 wherein the silica gel has a particle size of 3 to 200 mesh.

3. The process of claim 1 wherein the temperature of the adsorption zone is within the range of 20 to 40° C.

4. The process of claim 1 wherein the pressure of the adsorption zone is approximately 0 to 500 p.s.i.g.

5. The process of claim 1 wherein the impure hydrocarbon fraction in the adsorption zone is in the vapor state and the flow velocity within the adsorption zone is no greater than 3.00 parts by weight of hydrocarbon per hour per part by weight of silica gel.

6. The process of claim 1 wherein the flow velocity of the inert regeneration gas through the adsorption zone is 50 to 10,000 gaseous volumes per hour per volume of silica gel.

7. The process of claim 1 wherein the inert regeneration gas is passed through the adsorption zone in a direction opposite to the direction in which the impure hydrocarbon fraction was passed during the adsorption period.

8. The process of claim 1 wherein the inert gas is a fuel gas comprising primarily methane.

9. The process of claim 1 wherein the temperature of the silica gel during regeneration is 220 to 275° C.

10. The process of claim 1 wherein the nitrogen-containing organic compound is a N,N-dialkylarylamide solvent.

References Cited by the Examiner

UNITED STATES PATENTS

| | | | |
|---|---|---|---|
| 2,728,715 | 12/1955 | Rampino | 208—254 |
| 2,763,603 | 9/1956 | Skinner | 208—254 |
| 3,005,826 | 10/1961 | Fleck et al. | 208—254 |
| 3,051,648 | 8/1962 | Hess et al. | 208—254 |
| 3,055,825 | 9/1962 | Buningh et al. | 208—254 |

DELBERT E. GANTZ, *Primary Examiner.*

S. P. JONES, *Assistant Examiner.*